United States Patent
Kimura et al.

(10) Patent No.: US 8,269,122 B2
(45) Date of Patent: Sep. 18, 2012

(54) LEVER SWITCH DEVICE

(75) Inventors: Yusuke Kimura, Aichi (JP); Kenpo Kurachi, Aichi (JP); Shigeo Nakamura, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 574 days.

(21) Appl. No.: 12/326,480

(22) Filed: Dec. 2, 2008

(65) Prior Publication Data

US 2009/0145735 A1 Jun. 11, 2009

(30) Foreign Application Priority Data

Dec. 6, 2007 (JP) .................................. 2007-316323

(51) Int. Cl.
*H01H 3/16* (2006.01)
*H01H 9/00* (2006.01)

(52) U.S. Cl. .................................. 200/61.54; 200/61.27

(58) Field of Classification Search .................. 200/335, 200/61.28, 61.54, 61.27

See application file for complete search history.

(56) References Cited

U.S. PATENT DOCUMENTS

| 4,518,836 A * | 5/1985 | Wooldridge ................ 200/61.54 |
| 6,025,565 A | 2/2000 | Miyase et al. | |
| 6,172,311 B1 * | 1/2001 | Hayashi ..................... 200/61.27 |

FOREIGN PATENT DOCUMENTS

| EP | 0 577 499 A1 | 1/1994 |
| FR | 2 765 387 A1 | 12/1998 |
| FR | 2 870 634 A1 | 11/2005 |
| JP | 11-250772 A | 9/1999 |

OTHER PUBLICATIONS

European Search Report dated Oct. 23, 2009 from corresponding European Patent Application No. EP 08 17 0534.
Office Action dated Apr. 30, 2010 issued by the Chinese Patent Office in corresponding Chinese Patent Application No. 200810182765.6.

* cited by examiner

*Primary Examiner* — Felix O Figueroa
(74) *Attorney, Agent, or Firm* — Roberts Mlotkowski Safran & Cole P.C.

(57) ABSTRACT

A lever switch device, includes a lever main body rotatably supported by a body around a predetermined rotation center axis, a first remote shaft rotatably incorporated in the lever main body, and comprising a first operating knob at one end and a first operation portion at another end for operating an operational object by a rotational operation of the first operating knob, a second remote shaft rotatably arranged in the lever main body with a coaxial structure with the first remote shaft, and includes a second operating knob at one end and a second operation portion at another end for operating an operational object by a rotational operation of the second operating knob. Rotation centers of the first and second operation portions are provided on the rotation center axis of the lever main body.

7 Claims, 4 Drawing Sheets

LEVER SWITCH DEVICE

The present application is based on Japanese Patent Application No. 2007-316323 filed on Dec. 6, 2007, the entire contents of which are incorporated herein by reference.

BACKGROUND OF THE INVENTION

1. Field of the Invention

The present invention relates to a lever switch device, in more particular, to a lever switch device applied to a vehicle such as an automobile, etc.

2. Related Art

An example of a lever switch device applied to a vehicle such as an automobile, etc. is configured to provide two operating knobs at tip portions of a lever which operates a turn signal switch. In the case of this configuration, the lever is rotatably provided on a body and, at the same time, two remote shafts operated by the two operating knobs are incorporated in the lever in a rotatable state. Then, switches corresponding to the two operating knobs provided on the body are configured to carry out a switching operation by a rotation of the tip portions of the remote shafts according to a rotational operation of the operating knobs (e.g., JP-A 11-250772).

According to the lever switch device, since two rotationally operable operating knobs are provided in the lever, it is possible to simplify a structure in the lever and thereby to realize a lever switch for a vehicle having an downsized operating lever.

However, according to the lever switch device of JP-A 11-250772, since rotation centers of the tip portions of the remote shafts operated by the two operating knobs are not provided on a rotation center axis of the lever, there is a problem in that a position of the tip portion of the remote shaft moves at the time of a rotational operation of the lever, e.g., at the time of a turn signal operation, resulting that switching accuracy of switches corresponding to the two operating knobs provided in the body is deteriorated or an operation angle of the lever is limited.

THE SUMMARY OF THE INVENTION

It is an object of the invention to provide a lever switch device in that switching accuracy of switches provided on a body side corresponding to operating knobs is not deteriorated or an operation angle of the lever is not limited even when the lever is rotationally operated.

[1] According to a feature of the present invention, a lever switch device, comprising:

a lever main body rotatably supported by a body around a predetermined rotation center axis;

a first remote shaft rotatably incorporated in the lever main body, and comprising a first operating knob at one end and a first operation portion at another end for operating a switch provided on the body side by a rotational operation of the first operating knob;

a second remote shaft rotatably arranged in the lever main body with a coaxial structure with the first remote shaft, and comprising a second operating knob at one end and a second operation portion at another end for operating a switch provided on the body side by a rotational operation of the second operating knob, wherein rotation centers of the first and second operation portions are provided on the rotation center axis of the lever main body and the first or second operation portion operates the switch via an arm.

[2] In the lever switch device described in above-mentioned [1], the operational object may be a switch provided on the body side.

[3] Furthermore, in the lever switch device described in above-mentioned [2], the first or second operation portion may operate the switch via an arm.

Effect of the Invention

According to the invention, it is possible to provide a lever switch device in that switching accuracy of switches provided on a body side corresponding to operating knobs is not deteriorated or an operation angle of the lever is not limited even when the lever is rotationally operated.

BRIEF DESCRIPTION OF THE DRAWINGS

Next, the present invention will be explained in more detail in conjunction with appended drawings, wherein.

DESCRIPTION OF THE PREFERRED EMBODIMENTS

Next, preferred embodiments according to the present invention will be explained in conjunction with appended drawings.

First Embodiment of the Invention

Figure 1:
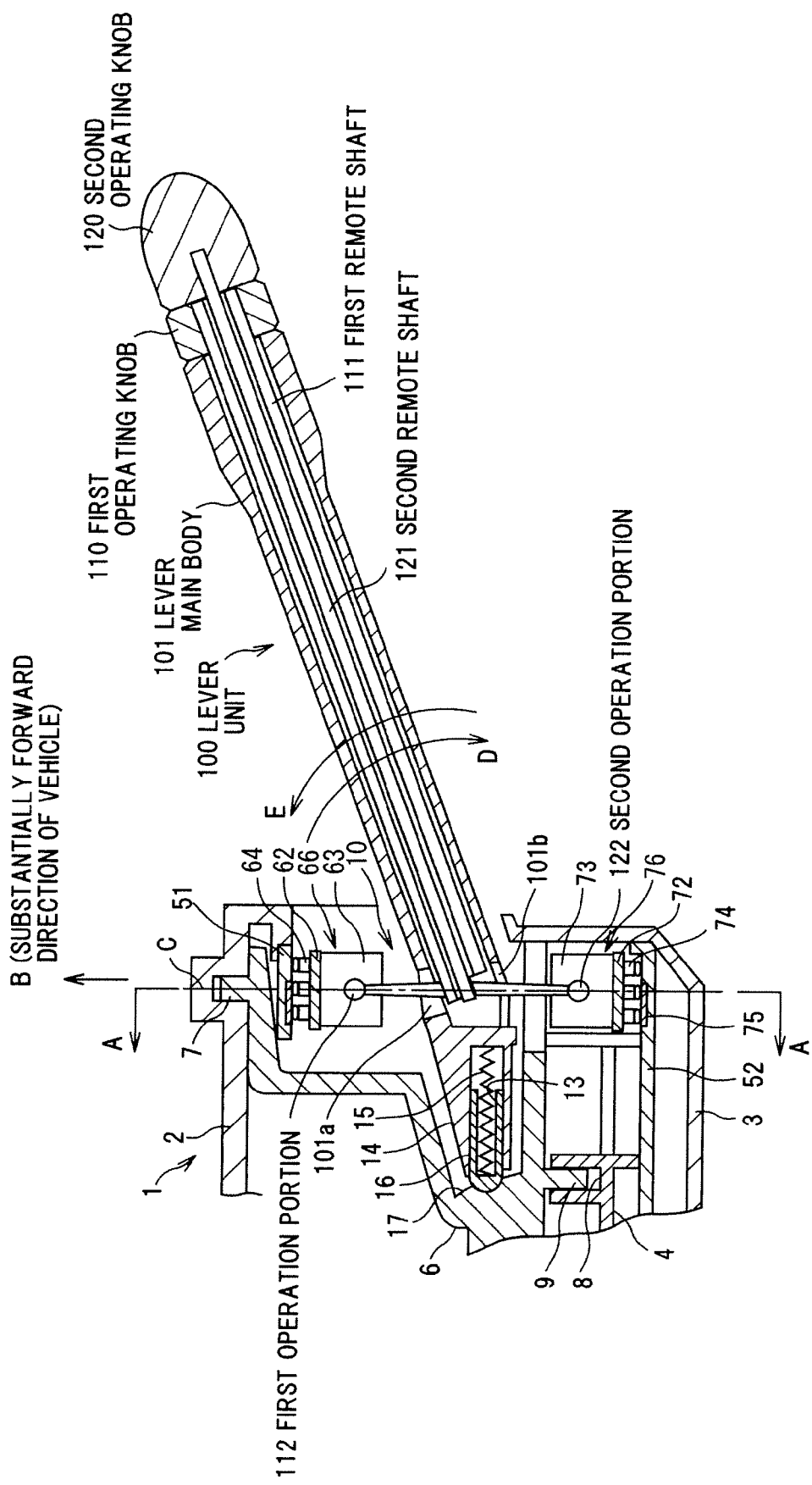
FIG. 1 is a cross sectional view showing a lever switch device in a first preferred embodiment of the present invention.
Figure 2:
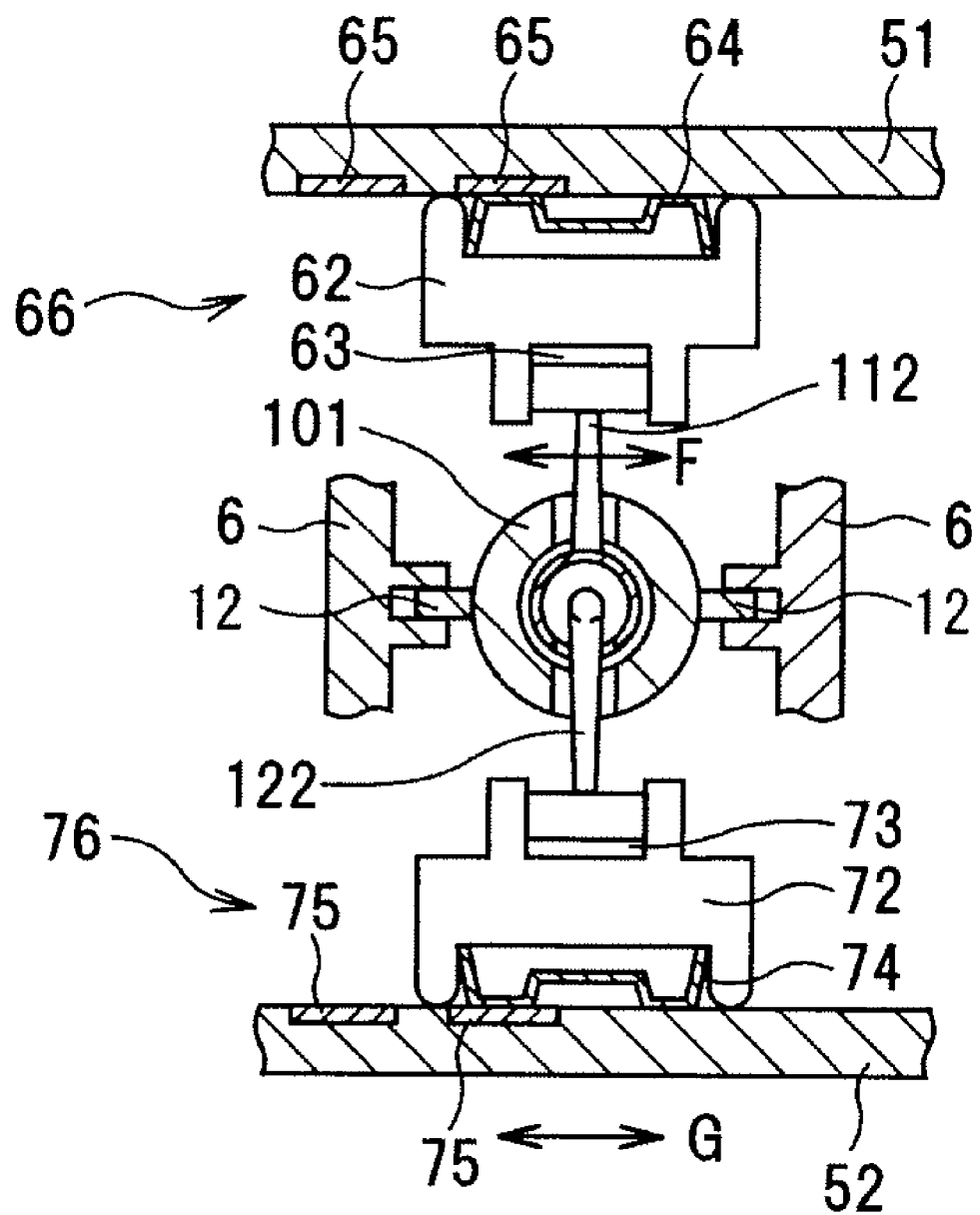
FIG. 2 is a cross sectional view along A-A line in FIG. 1 including a rotation axis C of a lever main body.

FIG. 1 is a cross sectional view showing a lever switch device in a first embodiment of the present invention. FIG. 2 is a cross sectional view along A-A line in FIG. 1 including a rotation axis C of a lever main body.

The lever switch device shown in FIG. 1 is provided at a peripheral portion of a steering column of a vehicle which is not illustrated, and a direction B in FIG. 1 is a substantially forward direction of the vehicle, hence, FIG. 1 is a cross sectional view of the lever switch device when viewed from an upward direction of the vehicle.

A body 1 includes a front case 2 and a back case 3, and an outer shell of the body 1 is composed of the front case 2 and the back case 3. A middle case 4 and substrates 51 and 52 are provided between the front case 2 and the back case 3. A bracket 6 is rotatably provided around a stem portion 7 between the front case 2 and the middle case 4.

A rotation direction of the bracket 6 is a direction about the rotation axis C of a lever unit 100 around the stem portion 7. For guiding a rotation of the bracket 6, a groove 8 is formed on an upper side of the middle case 4 in FIG. 1 and a convex portion 9 which is slidingly movable in the groove 8 is formed in the bracket 6. The groove 8 is a groove in a circular arc shape concentric with the stem portion 7, even though it is not illustrated.

In addition, a hollow portion 10 is formed on a right side of the bracket 6 in FIG. 1, and a proximal end of the lever unit 100 is inserted into the hollow portion 10. The lever unit 100 is rotatably provided around a stem portion 12 shown in FIG. 2. Rotation directions of the lever unit 100 around the stem portion 12 are an arrow D direction (rear) and an E direction (forward) opposite thereto as shown in FIG. 1. In this case, the lever unit 100 is projecting to a right side of the body 1 in FIG. 1.

In addition, a projecting portion 14 having a hole 13 is formed at the proximal end of the lever unit 100. A spring 15 and a moderation piece 16 are housed in the hole 13. On the other hand, a moderation wall 17 having three roots is formed in an inner part of the hollow portion 10 in the bracket 6. In the state of FIG. 1, the moderation piece 16 of the lever unit 100 is fitted with a middle root of the moderation wall 17 by a biasing force of the spring 15.

The lever unit 100 is composed of a lever main body 101 having a cylindrical hollow section, a first remote shaft 111 integrally rotating with a first operating knob 110, a first operation portion 112 formed on an opposite side of the first operating knob 110 of the first remote shaft 111, a second remote shaft 121 integrally rotating with a second operating knob 120 and a second operation portion 122 formed on an opposite side of the second operating knob 120 of the second remote shaft 121. The lever unit 100 is a portion supported to be rotatable with respect to the body 1, and may include the above described moderation piece 16 or the like.

In the lever main body 101, the first remote shaft 111 is incorporated rotatably, the first operating knob 110 is mounted on one end of the first remote shaft 111 and the first operation portion 112 is attached to another end so as to project upward from a notch 101a of the lever main body 101 in FIG. 1. The first remote shaft 111 has a hollow portion therein and the second remote shaft 121 is rotatably arranged with a coaxial structure (concentrically arranged) in the hollow portion. And then, the second operating knob 120 is mounted on one end of the second remote shaft 121 and the second operation portion 122 is attached to another end so as to project downward from a notch 101b of the lever main body 101 in FIG. 1.

As shown in FIG. 1 and FIG. 2, the first operation portion 112 and the second operation portion 122 are arranged on the rotation axis C of the lever main body 101 (the lever unit 100) in FIG. 1. The each tip portion of the first operation portion 112 and the second operation portion 122 has only to be arranged at least on the rotation axis C of the lever main body 101.

A contact holder 62 is assembled in the front case 2, i.e. on a lower side of the substrate 51 attached to the body 1 side in FIG. 1, to be movable in a vertical direction (a direction orthogonal to the paper surface of FIG. 1). A fitting concave portion 63 is formed on a lower part of the contact holder 62 in FIG. 1 and FIG. 2, and the first operation portion 112 is fitted with the fitting concave portion 63. In the case of this configuration, the first operation portion 112 is rotationally operated when rotationally operating the first operating knob 110, and as shown in FIG. 2, the contact holder 62 is configured to reciprocate in a direction indicated by an arrow F.

In addition, a movable contact 64 is supported by the contact holder 62 on the substrate 51 side. On the other hand, a fixed contact 65 is provided on the substrate 51, and the movable contact 64 carries out a switching operation by contacting with and separating from the fixed contact 65 according to the movement of the contact holder 62. The movable contact 64 and the fixed contact 65 composes a first switch 66 provided on the body 1 side. The first switch 66 functions as, e.g., a light control switch for controlling turn-on/turn-off of a non-illustrated small lamp, etc.

Meanwhile, a contact holder 72 is assembled in the back case 3, i.e. on a upper side of the substrate 52 attached to the body 1 side in FIG. 1, to be movable in a vertical direction (a direction orthogonal to the paper surface of FIG. 1). A fitting concave portion 73 is formed on an upper part of the contact holder 72, and the second operation portion 122 is fitted with the fitting concave portion 73. In the case of this configuration, the second operation portion 122 is rotationally operated when rotationally operating the second operating knob 120, and as shown in FIG. 2, the contact holder 72 is configured to reciprocate in a direction indicated by an arrow G.

In addition, a movable contact 74 is supported by the contact holder 72 on the substrate 52 side. On the other hand, a fixed contact 75 is provided on the substrate 52, and the movable contact 74 carries out a switching operation by contacting with and separating from the fixed contact 75 according to the movement of the contact holder 72. The movable contact 74 and the fixed contact 75 composes a second switch 76 provided on the body 1 side. The second switch 76 functions as, e.g., a light control switch for controlling turn-on/turn-off of a non-illustrated headlamp, etc.

Switching Operation by the Operating Knob

When the first operating knob 110 is rotationally operated, the first remote shaft 111 and the first operation portion 112 rotate integrally, the contact holder 62 is reciprocated by the first operation portion 112, thereby it is possible to carry out the switching operation of the first switch 66. Also, when the second operating knob 120 is rotationally operated, the second remote shaft 121 and the second operation portion 122 rotate integrally, the contact holder 72 is reciprocated by the second operation portion 122, thereby it is possible to carry out the switching operation of the second switch 76.

Motion of the Lever Switch Device

In addition, a third switch for carrying out a switching operation according to the rotation of the bracket 6, fourth and fifth switches for carrying out switching operations according to the rotations of the lever unit 100 in the arrow D and E directions in FIG. 1 are provided inside the body 1, even though none of them are illustrated. The third switch functions as, e.g., a switch for controlling a turn signal, the fourth switch functions as, e.g., a switch for carrying out a dimmer control of a headlamp and the fifth switch functions as, e.g., a switch for controlling passing.

When the lever main body 101 is rotationally operated about the rotation axis C around the stem portion 7 shown in FIG. 1, the lever main body 101 is rotationally moved with the bracket 6 around the stem portion 7 of the bracket 6. As a result, the non-illustrated third switch is operated and switch control of the turn signal is carried out. As for the rotational operation of the lever main body 101, moderation feeling is also imparted by a well-known moderation mechanism which is not illustrated.

Meanwhile, when the lever main body 101 is rotationally operated in a direction indicated by the arrow D (rear) in FIG. 1, the lever main body 101 rotates in the arrow D direction around the stem portion 12 shown in FIG. 2. As a result, the non-illustrated fourth switch is operated and the dimmer control of the headlamp is carried out. At this time, the moderation piece 16 crosses over a crest on an upper side in FIG. 1 from the middle root in the moderation wall 17 while compressing the spring 15, and is engaged with a root on its upper side. The moderation feeling is imparted to the operation of the lever main body 101 in the arrow D direction by this movement.

Meanwhile, when the lever main body 101 is rotationally operated in a direction indicated by the arrow E (forward), the lever main body 101 rotates in the arrow E direction around the stem portion 12 shown in FIG. 2. As a result, the non-illustrated fifth switch is operated and the passing control is carried out. At this time, the moderation piece 16 moves to a lower crest in FIG. 1 from the middle root in the moderation wall 17 while compressing the spring 15, and by the resistance thereof, the moderation feeling is imparted to the rotational operation of the lever main body 101 in a forward direction.

In case of this configuration, when the operation by a user is released at the moment that the moderation feeling is imparted, the lever main body 101 automatically returns as the moderation piece 16 is restored to the original root by the spring 15. On the other hand, after operating the aforementioned lever main body 101 backwards, the moderation piece 16 returns to the original root from the upper root in FIG. 1 crossing over the lower crest by manually returning the lever main body 101.

Effect of the First Embodiment of the Invention

According to the first embodiment of the invention, as shown in FIG. 1 and FIG. 2, the first operation portion 112 and the second operation portion 122 are arranged on the rotation axis C of the lever main body 101 (the lever unit 100) in FIG. 1. Even when the lever main body 101 is rotationally operated in this state about the rotation axis C around the stem portion 7 shown in FIG. 1, the first operation portion 112 and the second operation portion 122 stay on the rotation axis C. Therefore, regardless of the rotational operation of the lever main body 101, positional relations between the first operation portion 112 and the fitting concave portion 63 and between the second operation portion 122 and the fitting concave portion 73 are constant, and there are effects that switching accuracy (of the first switch 66 and the second switch 76) is not deteriorated and the operation angle of the lever is not limited. Furthermore, since the first switch 66 and the second switch 76 are attached to the body 1 side, the wiring, etc. is facilitated, and thus, it is possible to provide a lever switch device with high reliability at low cost.

Second Embodiment of the Invention

Figure 3:
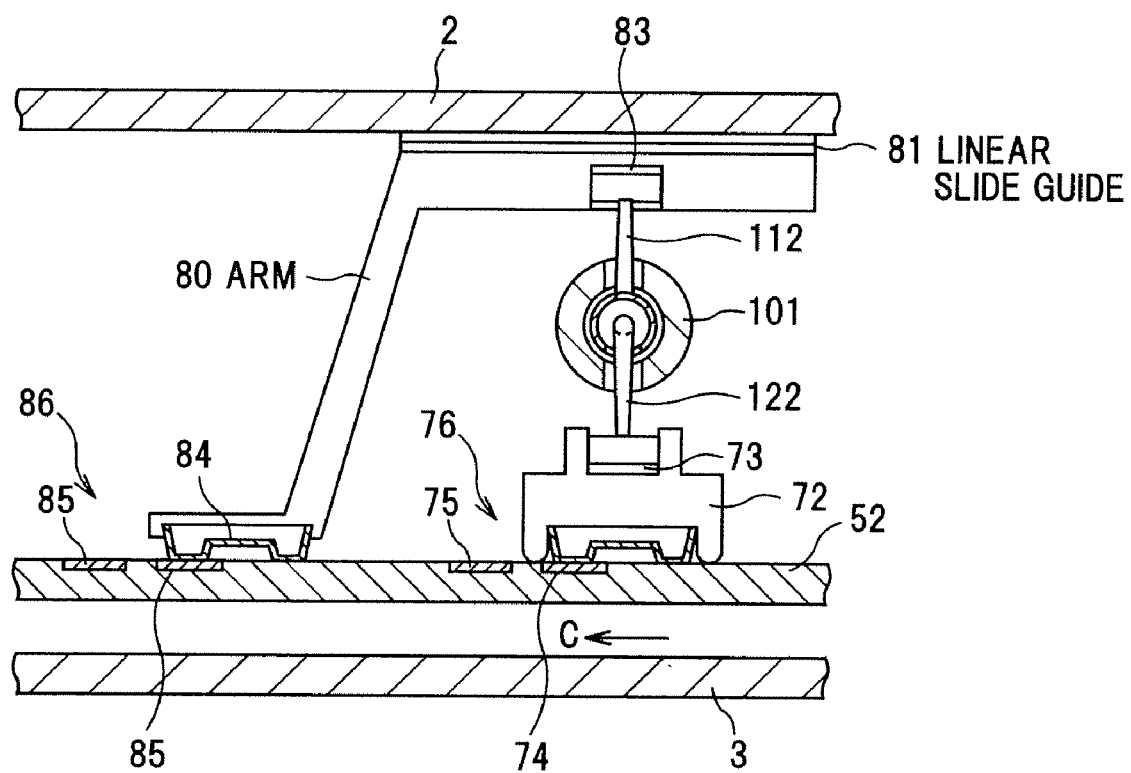
FIG. 3 is a cross sectional view showing a lever switch device in a second preferred embodiment of the invention, which is a view corresponding to an A-A cross-section in FIG. 1 including the rotation axis C of the lever main body.

FIG. 3 is a cross sectional view showing a lever switch device in a second embodiment of the invention, which is a view corresponding to an A-A cross-section in FIG. 1 including the rotation axis C of the lever main body. In the lever switch device according to the second embodiment, a first switch 86 is operated by an operation of the first operation portion 112 via an arm 80.

The arm 80 is slidably attached to the front case 2 side by, e.g., a linear slide guide 81, and the first operation portion 112 is fitted with a fitting concave portion 83 of the linear slide guide 81. In addition, a movable contact 84 is attached at an end of the arm 80 on the substrate 52 side. Meanwhile, on the substrate 52, a fixed contact 85 is pattern-formed on the same surface as the second switch 76, and a first switch 86 is composed of the movable contact 84 and the fixed contact 85. Other configurations are same as the first embodiment.

In the above configuration, in addition to the effect of the first embodiment, it is possible to mount the first switch 86 and the second switch 76 on one surface of the substrate 52, mounting to the substrate 52 is facilitated, thereby it is possible to provide a compact lever switch device at low cost.

Third Embodiment of the Invention

Figure 4:
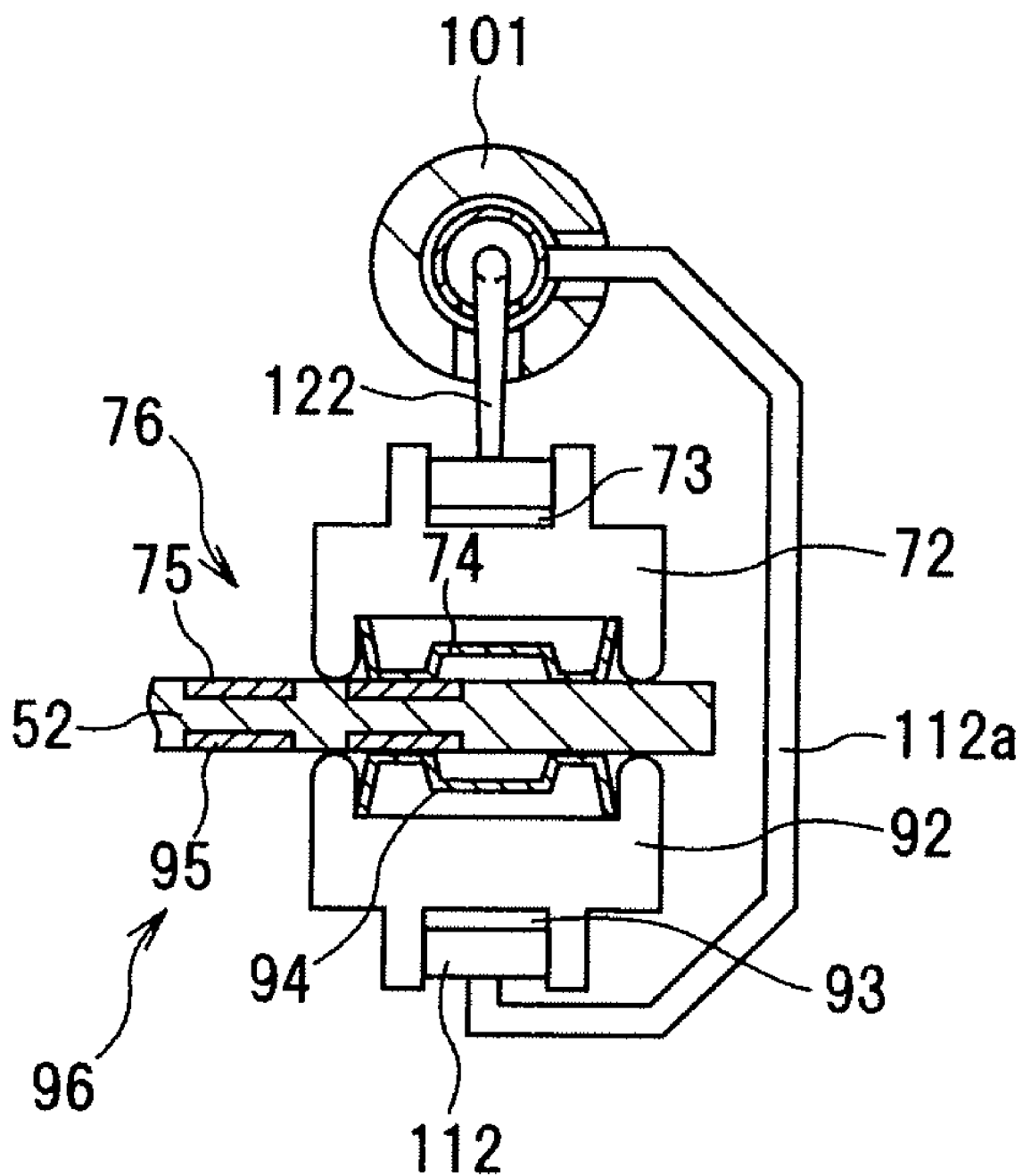
FIG. 4 is a cross sectional view showing a lever switch device in a third preferred embodiment of the invention, which is a view corresponding to an A-A cross-section in FIG. 1 including the rotation axis C of the lever main body.

FIG. 4 is a cross sectional view showing a lever switch device in a third embodiment of the invention, which is a view corresponding to an A-A cross-section in FIG. 1 including the rotation axis C of the lever main body. In the lever switch device according to the third embodiment, the first operation portion 112 is substantially U-shaped or substantially C-shaped as shown in FIG. 4, and operates a first switch 96 mounted on the substrate 52. The first operation portion 112 has an arm portion 112a in a substantially U-shape or C-shape, and as shown in FIG. 4, it is possible to transmit the rotational operation of the first operating knob 110 to a reverse side of the substrate 52. On the substrate 52, the first switch 96 is mounted on a reverse surface of the second switch 76 mounting surface. A tip portion of the operation portion 112 is fitted with a fitting concave portion 93 of a contact holder 92 in the first switch 96.

In the above configuration, it is possible to carry out switching operations of plural switches (the first switch 96 and the second switch 76) on the substrate 52 by the rotational operation of the first operating knob 110. Therefore, in addition to the effects of the first and second embodiments, it is possible to mount the first switch 86 and the second switch 76 on a single substrate 52, furthermore, similarly to the second embodiment, it is possible to operate the first switch 96 without intervening another arm, the mounting to the substrate 52 is facilitated and thereby it is possible to provide a compact lever switch device at low cost.

In the first to third embodiments of the invention, although the first remote shaft 111 and the second remote shaft 121 are rotatably arranged in the lever main body 101 with a coaxial structure, three or more the remote shafts may be arranged in the lever main body 101 with the coaxial structure. In other words, by the rotational operations of three or more operating knobs, it is possible to drive three or more the remote shafts and operation portions each corresponding thereto, and it is also possible to operate three or more switches by three or more operating knobs.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A lever switch device, comprising:
a bracket rotatably supported by a body around a predetermined rotation center axis;
a lever main body rotatably supported by the bracket and having an axis of rotation that is transverse to the rotation center axis of the bracket;
a first remote shaft rotatably incorporated in the lever main body, and comprising a first operating knob at one end and a first operation portion at another end for operating one switch provided on the body by a rotational operation of the first operating knob;
a second remote shaft rotatably arranged in the lever main body with a coaxial structure with the first remote shaft, and comprising a second operating knob at one end and a second operation portion at another end for operating another switch provided on the body by a rotational operation of the second operating knob,
wherein rotation centers of both the first and second operation portions are provided on the rotation center axis of the bracket and the first or second operation portion operates the switch via an arm, and
wherein the first and second operation portions are attached so as to project transversely from the axis of rotation of the lever main body in substantially opposite directions.

2. The lever switch device according to claim 1, wherein the first remote shaft comprises a hollow portion for rotatably arranging the second remote shaft therein with a coaxial structure.

3. The lever switch device according to claim 1, wherein tip portions of the first and second operation portions are each arranged at least on the rotation center axis of the bracket.

4. The lever switch device according to claim 1, wherein the one switch or the other switch is a light control switch for controlling turn-on/turn-off of a small lamp, a headlamp or controlling a dimmer or passing.

5. The lever switch device according to claim 1, wherein the arm is slidably attached to the body.

6. The lever switch device according to claim 1, wherein the arm is substantially C-shaped.

7. The lever switch device according to claim 6, wherein the switches are each mounted on front and reverse surfaces of a substrate provided on the body.

* * * * *